(12) United States Patent
Monge Nunez et al.

(10) Patent No.: US 11,163,965 B2
(45) Date of Patent: Nov. 2, 2021

(54) INTERNET OF THINGS GROUP DISCUSSION COACH

(71) Applicant: International Business Machines Corporation, Armonk, NY (US)

(72) Inventors: Roxana Monge Nunez, San Jose (CR); Ana Isabel Montero Soto, Alajuela (CR); Franklin Gerardo Fernandez Arias, Alajuela (CR); Priscilla Mariel Guzman Angulo, Santo Domingo (CR)

(73) Assignee: International Business Machines Corporation, Armonk, NY (US)

( * ) Notice: Subject to any disclaimer, the term of this patent is extended or adjusted under 35 U.S.C. 154(b) by 87 days.

(21) Appl. No.: 16/599,613

(22) Filed: Oct. 11, 2019

(65) Prior Publication Data
US 2021/0109997 A1 Apr. 15, 2021

(51) Int. Cl.
*G06F 40/56* (2020.01)
*G06F 16/335* (2019.01)
(Continued)

(52) U.S. Cl.
CPC ............ *G06F 40/56* (2020.01); *G06F 16/337* (2019.01); *G06F 16/3329* (2019.01); *G06F 16/355* (2019.01); *G06F 40/279* (2020.01)

(58) Field of Classification Search
CPC ...... G06F 40/30; G06F 40/56; G06F 2201/86; G06F 2201/865; G06F 40/279;
(Continued)

(56) References Cited

U.S. PATENT DOCUMENTS 6,923,652 B2  8/2005  Kerns et al.
7,818,179 B2  10/2010  Krasikov et al.
(Continued)

FOREIGN PATENT DOCUMENTS

KR    1020160142648 A    12/2016
WO       2019017922 A1    1/2019

OTHER PUBLICATIONS

Chollet, Mathieu et al., "An Interactive Virtual Audience Platform for Public Speaking Training", www.toastmasters.org, May 5, 2014, 2 pgs.
(Continued)

*Primary Examiner* — Linda Wong
(74) *Attorney, Agent, or Firm* — Daniel Yeates; Madeline F. Schiesser; Keohane & D'Alessandro, PLLC

(57) ABSTRACT

Approaches presented herein enable delivery of real-time internet of things (IoT) feedback to optimize a group discussion. More specifically, a set of data representing a discussion between users is captured and analyzed to generate a discussion profile that includes participation of the users. This profile is compared to a reference profile and, based on the comparison, a set of discussion participation improvement strategies for a user is generated. A strategy is selected from the set of discussion participation improvement strategies based on an identification of an availability of a set of IoT devices for delivery of the strategy. Instructions are then communicated, responsive to the captured discussion between the users, to an available IoT device to deliver the selected discussion participation improvement strategy to the user through an output user interface of the available IoT device during the discussion.

20 Claims, 5 Drawing Sheets

(51) Int. Cl.
*G06F 16/332* (2019.01)
*G06F 40/279* (2020.01)
*G06F 16/35* (2019.01)

(58) Field of Classification Search
CPC .... G06F 40/35; G06F 16/3329; G06F 16/337; G06F 21/32; G06F 40/284; G06N 20/00; G06N 3/08; G06K 9/00302; G06K 9/00355; G06K 9/00268; G06K 9/6215; G06K 9/00335; G06K 9/00362; G06K 9/627; G06Q 50/01; G06Q 30/0631; G06Q 10/06395; G06Q 30/0255; G06Q 30/0267; G06Q 30/0269; G10L 15/22; G10L 25/63; G10L 15/1815
See application file for complete search history.

(56) References Cited

U.S. PATENT DOCUMENTS

| | | | |
|---|---|---|---|
| 7,941,318 B2 | 5/2011 | Lu | |
| 9,691,296 B2 | 6/2017 | Hoque et al. | |
| 9,792,908 B1 | 10/2017 | Bassemir et al. | |
| 10,614,828 B1* | 4/2020 | Cowburn | G10L 15/26 |
| 2010/0278377 A1* | 11/2010 | Hamel | G10L 15/22 382/100 |
| 2014/0067375 A1* | 3/2014 | Wooters | G06F 40/40 704/9 |
| 2014/0191939 A1* | 7/2014 | Penn | G06F 3/015 345/156 |
| 2014/0278455 A1* | 9/2014 | Chandrasekaran | G16H 40/67 705/2 |
| 2016/0049094 A1 | 2/2016 | Gupta et al. | |
| 2016/0224803 A1* | 8/2016 | Frank | G06F 16/24578 |
| 2017/0026514 A1* | 1/2017 | Dwyer | G10L 25/72 |
| 2017/0169727 A1 | 6/2017 | Briggs et al. | |
| 2019/0050774 A1* | 2/2019 | Divine | G16H 50/20 |
| 2020/0226217 A1* | 7/2020 | Anders | G06F 40/30 |
| 2020/0344192 A1* | 10/2020 | Conley | G06N 3/0445 |
| 2020/0401794 A1* | 12/2020 | Ishii | G06K 9/00302 |

OTHER PUBLICATIONS

Khazan, Olga, "This App Reads Your Emotions on Your Face", The Atlantic, Jan. 15, 2014, 7 pgs.

Dickey, Megan Rose, SpeechCoach.ai helps you step up your public speaking game—TechCrunch, Sep. 17, 2017, 2 pgs.

Schneider, Jan et al., "Presentation Trainer: What experts and computers can tell about your nonverbal comunication", My APA Document, Jan. 22, 2017, 32 pgs.

Feloni, Richard, "7 Bad Speaking Habits That Turn People Off", Businessinsider.com, https://www.businessinsider.com/julian-treasure-bad-speaking-habits-2014-7, Jul. 7, 2014, 3 pgs.

"Tone Analyzer", IBM Watson Developer Cloud, https://tone-analyzer-demo.ng.bluemix.net/?cm_mc_uid=6343708625431517493067 0&cm_mc_sid_50200000=88388921543348463877&cm_mc_sid_52640000, Sep. 20, 2019, 2 pgs.

Wikipedia, "Nonverbal communication", https://en.wikipedia.org/wiki/Nonverbal_communication, Jun. 21, 2019, 22 pgs.

Appendix P, "List of IBM Patents or Patent Applications Treated as Related", 2 pages.

* cited by examiner

INTERNET OF THINGS GROUP DISCUSSION COACH

TECHNICAL FIELD

The present invention relates generally to an internet of things (IoT) network and, more specifically, to improving a group discussion between users in real time using IoT feedback.

BACKGROUND

The use of smart devices and other devices linked in an IoT network has become increasingly popular within and around a user's environment. The IoT network formed by these devices is generally a network that combines physical electronic devices with software, enabling these devices to form a connective network among themselves for the exchange of data. Each IoT device can be recognized as a separate computing system, but can also operate within the infrastructure of the IoT network. Some IoT devices may also have, for example, sensors for monitoring or actuators for performing tasks in the physical world. More specifically, the term "things" in IoT can refer to any of a wide variety of devices, from "smart" thermostats to "wearable" electronics. IoT devices and the IoT network formed therefrom can offer, among other things, a combination of hardware, software, data generation, and service performance that integrate computer systems into the physical world. This can permit a minimization of human intervention in areas traditionally requiring such, as well as greater efficiency and accuracy of systems under the control of one or more devices in an IoT environment.

SUMMARY

Approaches presented herein enable delivery of real-time internet of things (IoT) feedback to optimize a group discussion. More specifically, a set of data representing a discussion between users is captured and analyzed to generate a discussion profile that includes participation of the users. This profile is compared to a reference profile and, based on the comparison, a set of discussion participation improvement strategies for a user is generated. A strategy is selected from the set of discussion participation improvement strategies based on an identification of an availability of a set of IoT devices for delivery of the strategy. Instructions are then communicated, responsive to the captured discussion between the users, to an available IoT device to deliver the selected discussion participation improvement strategy to the user through an output user interface of the available IoT device during the discussion.

One aspect of the present invention includes a method for improving a group discussion among a plurality of users in real time using internet of things (IoT) feedback, the method comprising: capturing a set of data representative of the discussion between the plurality of users; analyzing the captured data for a discussion dynamic between at least two users of the plurality of users, the analyzing comprising assigning a set of values to a verbal element of the discussion, a non-verbal element of the discussion, and a paralanguage element of the discussion, to generate a profile of the discussion, the discussion profile comprising a participation profile for each of the at least two users; comparing at least one of the participation profiles in the discussion profile to a reference participation profile having a set of values that indicate an optimal verbal discussion, non-verbal discussion, and paralanguage discussion; generating, based on the comparison, a set of discussion participation improvement strategies for at least one of the plurality of users; selecting a discussion participation improvement strategy from the set of discussion participation improvement strategies based on an identification of an availability of a set of IoT devices for delivery of at least one of the set of discussion participation improvement strategies; and communicating, responsive to the captured discussion between the plurality of users, instructions to deliver the selected discussion participation improvement strategy to the at least one of the plurality of users through an output user interface of the available IoT device during the discussion.

Another aspect of the present invention includes a computer system for improving a group discussion among a plurality of users in real time using internet of things (IoT) feedback, the computer system comprising: a memory medium comprising program instructions; a bus coupled to the memory medium; and a processor, for executing the program instructions, coupled to an IoT group discussion coach engine via the bus that when executing the program instructions causes the system to: capture a set of data representative of the discussion between the plurality of users; analyze the captured data for a discussion dynamic between at least two users of the plurality of users, the analyzing comprising assigning a set of values to a verbal element of the discussion, a non-verbal element of the discussion, and a paralanguage element of the discussion, to generate a profile of the discussion, the discussion profile comprising a participation profile for each of the at least two users; compare at least one of the participation profiles in the discussion profile to a reference participation profile having a set of values that indicate an optimal verbal discussion, non-verbal discussion, and paralanguage discussion; generate, based on the comparison, a set of discussion participation improvement strategies for at least one of the plurality of users; select a discussion participation improvement strategy from the set of discussion participation improvement strategies based on an identification of an availability of a set of IoT devices for delivery of at least one of the set of discussion participation improvement strategies; and communicate, responsive to the captured discussion between the plurality of users, instructions to deliver the selected discussion participation improvement strategy to the at least one of the plurality of users through an output user interface of the available IoT device during the discussion.

Yet another aspect of the present invention includes a computer program product for improving a group discussion among a plurality of users in real time using internet of things (IoT) feedback, the computer program product comprising a computer readable hardware storage device, and program instructions stored on the computer readable hardware storage device, to: capture a set of data representative of the discussion between the plurality of users; analyze the captured data for a discussion dynamic between at least two users of the plurality of users, the analyzing comprising assigning a set of values to a verbal element of the discussion, a non-verbal element of the discussion, and a paralanguage element of the discussion, to generate a profile of the discussion, the discussion profile comprising a participation profile for each of the at least two users; compare at least one of the participation profiles in the discussion profile to a reference participation profile having a set of values that indicate an optimal verbal discussion, non-verbal discussion, and paralanguage discussion; generate, based on the comparison, a set of discussion participation improvement strategies for at least one of the plurality of users; select a discussion participation improvement strategy from the set of discussion participation improvement strategies based on an identification of an availability of a set of IoT devices for delivery of at least one of the set of discussion participation improvement strategies; and communicate, responsive to the captured discussion between the plurality of users, instructions to deliver the selected discussion participation improvement strategy to the at least one of the plurality of users through an output user interface of the available IoT device during the discussion.

Still yet, any of the components of the present invention could be deployed, managed, serviced, etc., by a service provider who offers to implement passive monitoring in a computer system.

Embodiments of the present invention also provide related systems, methods, and/or program products.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which.

Figure 1:
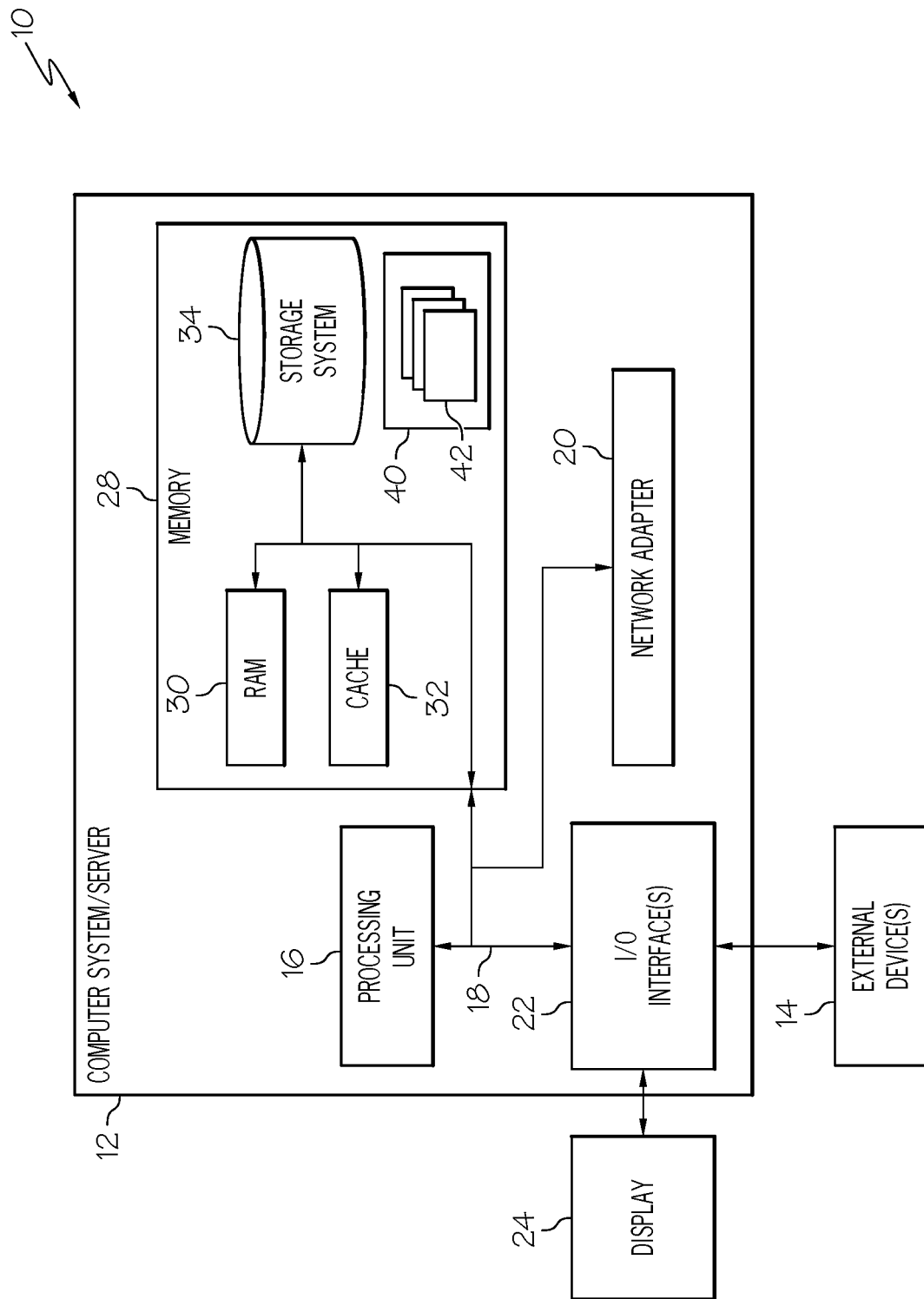
FIG. 1 shows an architecture in which the invention may be implemented according to illustrative embodiments.

The drawings are not necessarily to scale. The drawings are merely representations, not intended to portray specific parameters of the invention. The drawings are intended to depict only typical embodiments of the invention, and therefore should not be considered as limiting in scope. In the drawings, like numbering represents like elements.

DETAILED DESCRIPTION

Illustrative embodiments will now be described more fully herein with reference to the accompanying drawings, in which illustrative embodiments are shown. It will be appreciated that this disclosure may be embodied in many different forms and should not be construed as limited to the illustrative embodiments set forth herein. Rather, these embodiments are provided so that this disclosure will be thorough and complete and will fully convey the scope of this disclosure to those skilled in the art.

Furthermore, the terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. Furthermore, similar elements in different figures may be assigned similar element numbers. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Unless specifically stated otherwise, it may be appreciated that terms such as "processing," "detecting," "determining," "evaluating," "receiving," or the like, refer to the action and/or processes of a computer or computing system, or similar electronic data center device, that manipulates and/or transforms data represented as physical quantities (e.g., electronic) within the computing system's registers and/or memories into other data similarly represented as physical quantities within the computing system's memories, registers or other such information storage, transmission or viewing devices. The embodiments are not limited in this context.

As stated above, embodiments described herein provide for delivery of real-time internet of things (IoT) feedback to optimize a group discussion. More specifically, a set of data representing a discussion between users is captured and analyzed to generate a discussion profile that includes participation of the users. This profile is compared to a reference profile and, based on the comparison, a set of discussion participation improvement strategies for a user is generated. A strategy is selected from the set of discussion participation improvement strategies based on an identification of an availability of a set of IoT devices for delivery of the strategy. Instructions are then communicated, responsive to the captured discussion between the users, to an available IoT device to deliver the selected discussion participation improvement strategy to the user through an output user interface of the available IoT device during the discussion.

Referring now to FIG. 1, a computerized implementation 10 of an embodiment for improving a group discussion among a plurality of users in real time using IoT feedback will be shown and described. Computerized implementation 10 is only one example of a suitable implementation and is not intended to suggest any limitation as to the scope of use or functionality of embodiments of the invention described herein. Regardless, computerized implementation 10 is capable of being implemented and/or performing any of the functionality set forth hereinabove.

In computerized implementation 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

This is intended to demonstrate, among other things, that the present invention could be implemented within a network environment (e.g., the Internet, a wide area network (WAN), a local area network (LAN), a virtual private network (VPN), etc.), a cloud computing environment, a cellular network, or on a stand-alone computer system. Communication throughout the network can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer system/server 12 is intended to demonstrate that some or all of the components of implementation 10 could be deployed, managed, serviced, etc., by a service provider who offers to implement, deploy, and/or perform the functions of the present invention for others.

Computer system/server 12 is intended to represent any type of computer system that may be implemented in deploying/realizing the teachings recited herein. Computer system/server 12 may be described in the general context of computer system/server executable instructions, such as program modules, being executed by a computer system. Generally, program modules may include routines, programs, objects, components, logic, data structures, and so on, that perform particular tasks or implement particular abstract data types. In this particular example, computer system/server 12 represents an illustrative system for improving a group discussion among a plurality of users in real time using IoT feedback. It should be understood that any other computers implemented under the present invention may have different components/software, but can perform similar functions.

Computer system/server 12 in computerized implementation 10 is shown in the form of a general-purpose computing device. The components of computer system/server 12 may include, but are not limited to, one or more processors or processing units 16, a system memory 28, and a bus 18 that couples various system components including system memory 28 to processing unit 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Processing unit 16 refers, generally, to any apparatus that performs logic operations, computational tasks, control functions, etc. A processor may include one or more subsystems, components, and/or other processors. A processor will typically include various logic components that operate using a clock signal to latch data, advance logic states, synchronize computations and logic operations, and/or provide other timing functions. During operation, processing unit 16 collects and routes signals representing inputs and outputs between external devices 14 and input devices (not shown). The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the signals may be encrypted using, for example, trusted key-pair encryption. Different systems may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)).

In general, processing unit 16 executes computer program code, such as program code for improving a group discussion among a plurality of users in real time using IoT feedback, which is stored in memory 28, storage system 34, and/or program/utility 40. While executing computer program code, processing unit 16 can read and/or write data to/from memory 28, storage system 34, and program/utility 40.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media, (e.g., VCRs, DVRs, RAID arrays, USB hard drives, optical disk recorders, flash storage devices, and/or any other data processing and storage elements for storing and/or processing data). By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and/or an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation. Memory 28 may also have an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/ server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

The inventors of the present invention have found that delivering group discussion improvement feedback in real time to a discussion participant without negatively interfering with his or her ability to participate in the conversation can be challenging. A discussion participant may find hand waving or other attention-drawing feedback distracting and confusing, lacking a clear sense of what element of his or her participation requires improvement or what he or she should actually do to improve. Moreover, engaging a group in conversation, whether it be debate, brainstorming, or merely "small-talk," is a common challenge for many people, demanding skills in verbal, non-verbal and paralanguage communication, which are not easy to achieve. It can be particularly difficult to determine which of these skills requires improvement, and to then deliver training specific to that skill without harming any other. Conveying nuances, such as instructions to alter not spoken words themselves, but rather how they are spoken, generally requires a review of the discussion after the fact, with a detailed debriefing on participation strengths and weaknesses. In situations where the discussion participant is addressing a live group, such post-discussion instructions would come too late.

Accordingly, the inventors of the present invention have developed a system that learns a user's verbal, non-verbal, and paralanguage discussion participation behaviors (e.g., gestures, posture, etc.) and, based on these learned behaviors, discreetly conveys recommended ameliorative actions to the user through actuators or other user interfaces of one or more IoT devices in real time, concurrent with the group discussion. Furthermore, embodiments of the present invention offer techniques for optimizing IoT group discussion participation improvement strategies based on such learning, reactions of other participants in the group discussion, and other ambient conditions, and available IoT devices.

Furthermore, embodiments of the present invention offer several advantages to IoT technology. Whereas personal devices can often be a source of poor communication between people, due to offering distractions and interrupting normal speech and conversation, embodiments of the present invention permit IoT devices to seamlessly communicate information to a person while he or she is in the midst of a group discussion, without interrupting or detracting from that person's participation. Furthermore, embodiments of the present invention provide IoT devices with the ability to provide coaching and feedback in real time during a group discussion.

Figure 2:
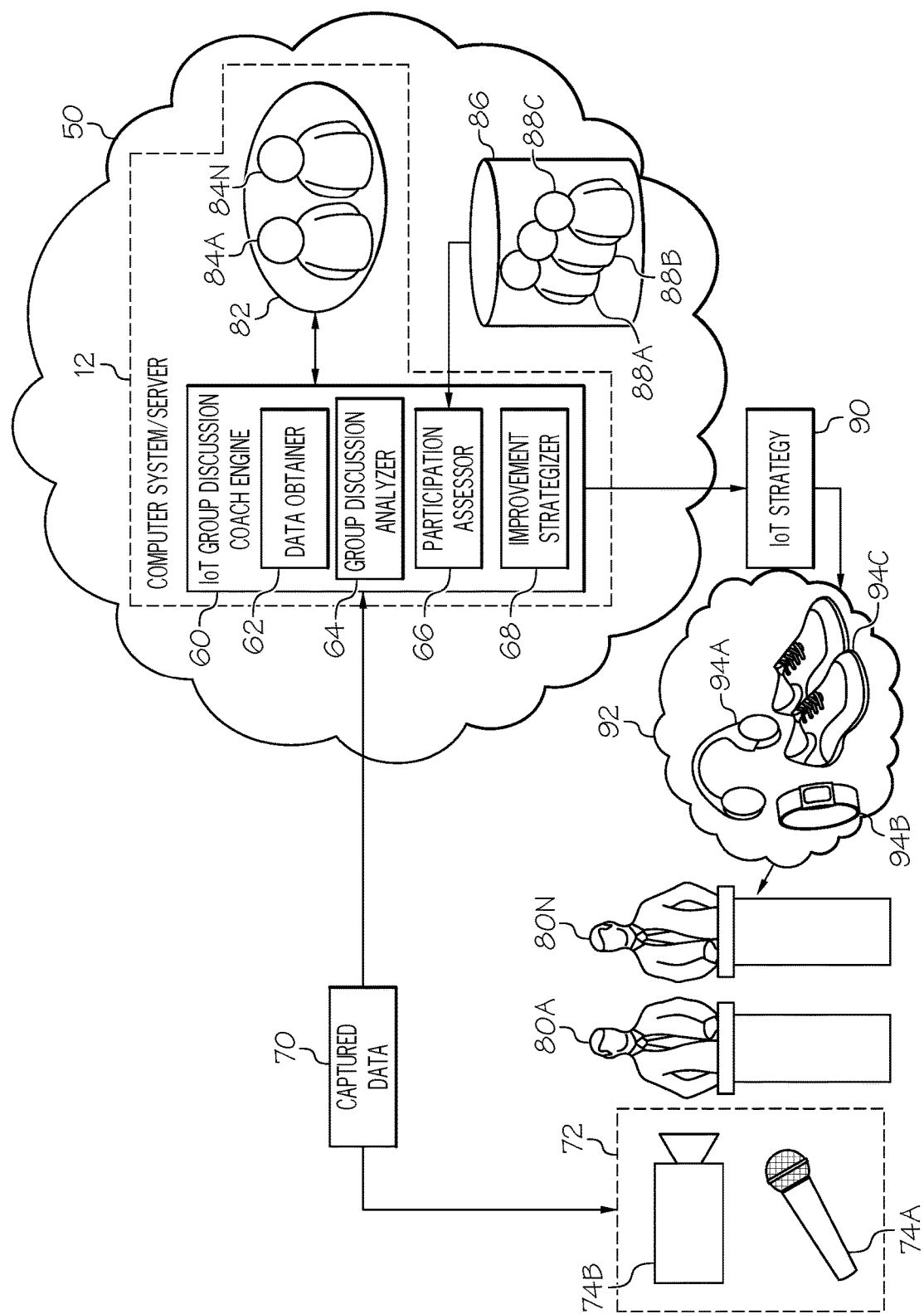
FIG. 2 shows a system diagram describing the functionality discussed herein according to illustrative embodiments.

Referring now to FIG. 2, a system diagram describing the functionality discussed herein according to an embodiment of the present invention is shown. It is understood that the teachings recited herein may be practiced within any type of computing environment, including, but not limited to, a networked computing environment (e.g., a cloud computing environment 50). A stand-alone computer system/server 12 is shown in FIG. 2 for illustrative purposes only. In the event the teachings recited herein are practiced in a networked computing environment, each client need not have an IoT group discussion coach engine 60 (hereinafter "system 60"). Rather, all or part of system 60 could be loaded on a server or server-capable device that communicates (e.g., wirelessly) with the clients to provide for delivery of real-time IoT feedback to optimize participation in a group discussion. Regardless, as depicted, system 60 is shown within computer system/server 12. In general, system 60 can be implemented as program/utility 40 on computer system 12 of FIG. 1 and can enable the functions recited herein.

Along these lines, system 60 may perform multiple functions similar to a general-purpose computer. Specifically, among other functions, system 60 can improve group discussion interactions of a user in real time using IoT feedback in a networked computing environment. To accomplish this, system 60 can include a set of components (e.g., program modules 42 of FIG. 1) for carrying out embodiments of the present invention. These components can include, but are not limited to, discussion participation data obtainer 62, group discussion analyzer 64, discussion participation assessor 66, and discussion participation improvement strategizer 68.

Through computer system/server 12, system 60 can receive data 70 captured from one or more sensors 72 (e.g., microphone 74A and/or camera 74B) of a group discussion between one or more users 80A-N. System 60 can create and maintain (e.g., update) a profile 82 of the discussion on computer system/server 12 or any other associated computer system/server. This discussion profile can include one or more profiles 84A-N of users 80A-N. Through computer system/server 12, system 60 can also access discussion participation and interaction databases 86, which can include one or more reference discussion participation/interaction profiles 88A-C. Through computer system/server 12, system 60 can furthermore deliver a IoT discussion participation/interaction strategy 90 to one or more IoT devices 94A-C of an IoT network 92 associated with at least one user 80N. These and other features of embodiments of the present invention will be further discussed with reference to FIG. 3 below.

According to embodiments of the present invention, discussions can include any conversation between two or more people. A discussion can range from, but is not limited to, a conversation as short as a question and answer to an ongoing interaction, such as a debate, brainstorming session, or social exchange (e.g., small talk). A discussion can have any number of participants. In some embodiments, one of these participants is a user of system 60. In still other embodiments, more than one participant is a user of system 60. In some embodiments, the group of users can use the same system 60, which can offer discussion participation strategies to more than one user in tandem, such as a recommendation that one user give other participants an opportunity to speak paired with an essentially simultaneous recommendation to another user that she offer a contribution to the discussion. In still other embodiments, each user can have his or her own system 60, which acts independently of one another.

Figure 3:
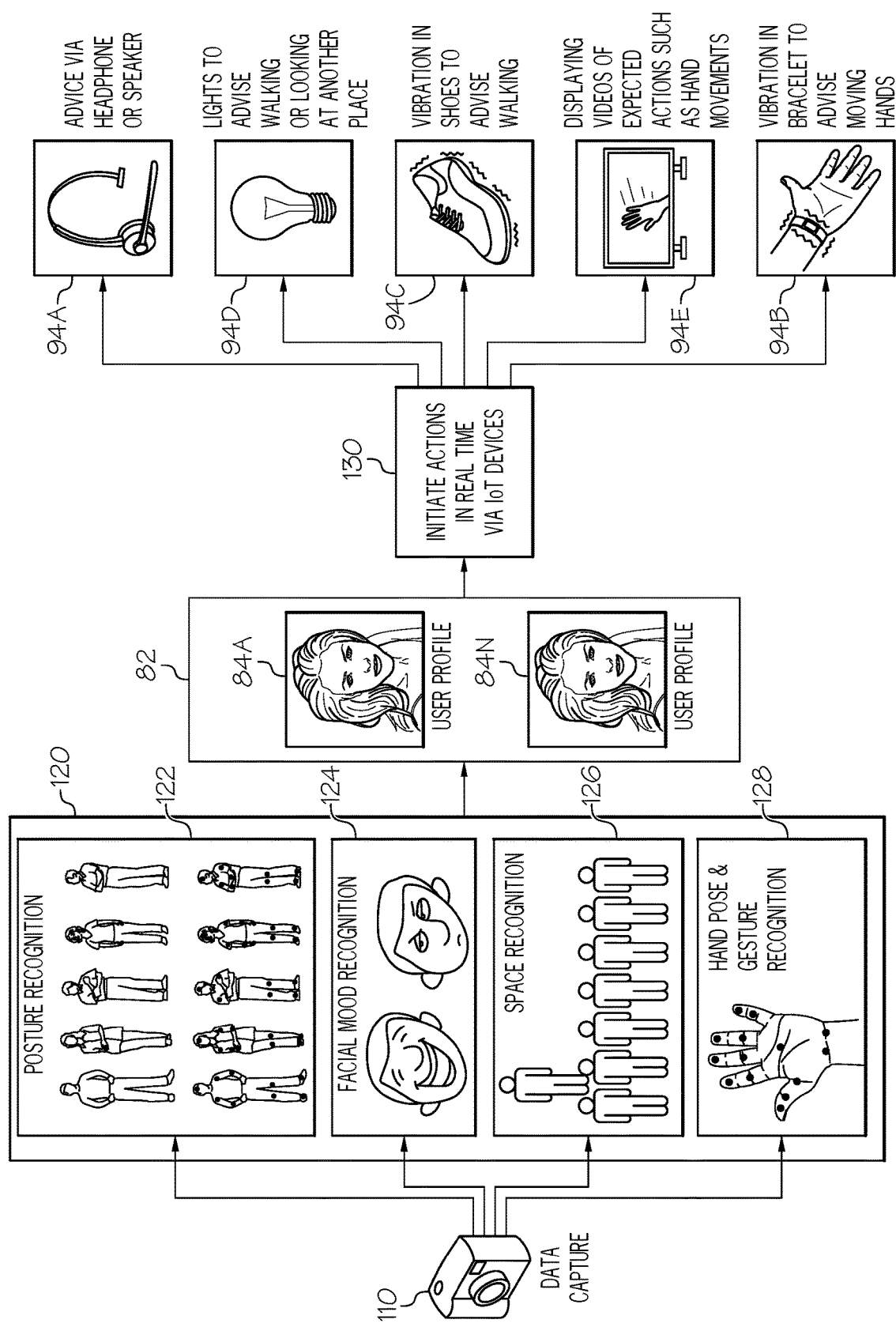
FIG. 3 shows an illustrative embodiment of improving a group discussion among a plurality of users in real time using IoT feedback according to illustrative embodiments.

Referring now to FIG. 3 in connection with FIG. 2, an illustrative embodiment of improving a group discussion among a plurality of users in real time using IoT feedback is shown. Discussion participation data obtainer 62 (hereinafter "obtainer 62"), as performed by computer system/server 12, can capture a set of data 70 representative of a discussion among a plurality of users 80A-N at data capture step 110. To accomplish this, obtainer 62 can receive a live data feed from one or more sensors 72 that monitor one or more users 80A-N, an area around one or more users 80A-N, and/or an audience or other participants in the discussion. These sensors 72 can include, but are not limited to, visual sensors (e.g., camera 74B), audio sensors (e.g., microphone 74A), motion sensors (e.g., floor pressure sensors, infrared motion sensors, accelerometer sensors on the body of user 80), biological sensors (e.g., sensors that measure a user's blood pressure, pulse/heart rate, and/or temperature), etc. In some embodiments, one or more sensors of sensors 72 can be an IoT device of IoT network 92 associated with at least one user 80N. For example, a microphone or camera on a wearable device of IoT network 92, worn by user 80N, can be configured to relay captured data 70 to obtainer 62.

Obtainer 62 can obtain a variety of types of data representative of elements of the group discussion between the one or more users 80A-N, as well as non-user participants in the group discussion. For example, in some embodiments, obtainer 62 can capture verbal communication (e.g., from an audio sensor). Verbal communication is the words spoken by user 80N and their meaning as would be interpreted from a transcript of those spoken words. Obtainer 62 can also or alternatively capture non-verbal communication (e.g., from an audio sensor that detects a tone of words spoken by user 80N, from a visual or motion sensor that detects actions and a physical presence of user 80N, such as pacing or hand movements), such as facial expressions, posture, gestures, appearance, personal space, frequency of speech, etc. Non-verbal communication refers to expressions indicated using signals other than words. Such non-verbal communication can include, but is not limited to, body language (kinesics), distance (proxemics), physical environment and appearance, voice (paralanguage), touch (haptics), timing (chronemics), and oculesics (e.g., eye contact, looking while talking, frequency of glances, patterns of fixation, pupil dilation, blink rate, etc.). Obtainer 62 can be configured to take particular note of non-verbal voice/paralanguage communication, as such plays a large role in social interaction during a group discussion. Paralanguage can include, but is not limited to, voice quality, rate, pitch, volume, mood, and speaking style, as well as prosodic features such as rhythm, intonation, and stress, as well as instances of attempts to speak or successful acts of speech.

In some embodiments, obtainer 62 can capture information other than verbal, non-verbal, and paralanguage communication from discussion participation actions of user 80N. For example, in some embodiments, obtainer 62 can additionally or alternatively be configured to capture a reaction of other participants (either other users or non-user participants) in the discussion (e.g., in the case that the discussion is a brainstorming session) or of an audience to the discussion (e.g., in the case that the discussion is a public debate). Obtainer 62 can obtain non-verbal responses, such as position of eyes (e.g., focused on speaker or on something else), body posture (e.g., attentive or bored), and actions (e.g., nodding, smiling), from a visual or motion sensor focused on the other participants or audience. In some embodiments, other sensors, such as an audio sensor, can be used to detect other non-verbal and verbal responses, such as, for example, words of encouragement or interruptions from the other participants or audience.

Still referring to FIG. 3 in connection with FIG. 2, in some embodiments, group discussion analyzer 64 (hereinafter "analyzer 64") can detect a topic or goal of the discussion. This can be accomplished any number of ways, such as direct input by one or more users 80A-N prior to the discussion, or machine learning, which determines the topic or goal by analyzing snippets of the content of the discussion. Furthermore, analyzer 64 can determine an overall dynamic of the discussion by correlating several data feeds captured by obtainer 62. For example, an audio sensor may indicate that one participant is speaking far more than any other participant while a visual sensor indicates that the other participants are leaning away from him and not making eye contact. Analyzer 64 can, based on reference discussions 88A-C, which will be discussed in more detail below with respect to discussion participation assessor 66, determine that these elements, in combination, indicate that the overall dynamic of the discussion is discomfort, with many of the participants disagreeing with the main speaker, but not wishing to express such outright. Analyzer 64 can generate a discussion profile 82 with the correlated data and determined dynamics of the discussion. It should be understood that a discussion can contain a number of different dynamics, sometimes between merely some or all participants. Analyzer 64 can identify such dynamics between participants and add such identified dynamics to discussion participation profiles 84A-N (discussed in more detail further below) of users 80A-N in addition to discussion profile 82 itself.

In some embodiments, analyzer 64 can analyze a methodology of the discussion in order to allow system 60 to delivery an optimal IoT strategy based on such methodology. A discussion methodology can be determined, for example, by comparing a present discussion in discussion profile 82 to a reference discussion profile. Such discussion methodologies can include, but are not limited to design thinking, lean, agile, and combinations of such methodologies. In some embodiments, analyzer 64 can further break a discussion down by stages according to the discussion methodology being used. For example, analyzer 64 can identify each of the problem statement, understand, explore, prototype, playback, and evaluate stages of a discussion that uses the design thinking methodology. Analyzer 64 can further identify which of these stages the discussion is currently at in real time, permitting system 60 to offer strategies appropriate for the particular methodology or methodology stage. Elements of the discussion can be tagged in discussion profile 82 according to the methodology being used and/or the methodology stage.

Still referring to FIG. 3 in connection with FIG. 2, discussion participation assessor 66 (hereinafter "assessor 66"), as performed by computer system/server 12, can analyze captured data 70 for a discussion dynamic between at least two users of the plurality of users 80A-N by assigning a set of values to a verbal element of the discussion, a non-verbal element of the discussion, and a paralanguage element of the discussion, to generate a profile of the discussion at discussion participation/interaction recognition step 120. This discussion profile can include a participation profile for each of users 80A-N.

To accomplish this, assessor 66 can use machine learning techniques to identify features of the real-time discussion between one or more users 80A-N and other participants in the discussion, such as non-verbal communication features, and assign those features values (e.g., ratings, such as on a 1-10 scale or percentage) indicative of the a user's 80N skills at performing those features and/or indicative of a particular behavior associated with those skills (e.g., a user who over-gesticulates may be assigned a particular code or value, whereas a user who crosses his arms may be assigned a different code or value).

In some embodiments, assessor 66 can use posture recognition techniques 122 (e.g., based on existing object recognition techniques) to identify a posture of user 80N (or non-user participants) and the significance of that posture. For example, assessor 66 may determine from a visual or motion data feed that user 80N is speaking with his arms crossed and his shoulders hunched, indicating discomfort.

In some embodiments, additionally or alternatively, assessor 66 can use facial recognition techniques 124 to identify a mood, cognitive state, or feeling of user 80N (or non-user participants), such as joy, fear, sadness, anger, surprise, or contempt, indicating each with a value (e.g., the user is 45% fearful, 15% angry, and 40% surprised, corresponding with code XYZ). For example, assessor 66 may determine from a visual data feed that the eyebrows of user 80N are raised, indicating surprise or disbelief.

In yet some other embodiments, additionally or alternatively, assessor 66 can use a tone analyzer to analyze emotions and other paralanguage meanings conveyed by a tone of user 80N participating in the discussion. Assessor 66 can use analysis of tone to help corroborate the cognitive state or feelings of user 80N (or non-user participants) identified with facial recognition techniques 124. For example, assessor 66 may determine that the speech of user 80N is halting and uncertain, conveying a nervous tone. This could then be corroborated with the indication of surprise or disbelief detected above to determine that user 80N is frightened and unsure how to proceed with the discussion.

In still some other embodiments, additionally or alternatively, assessor 66 can use space recognition techniques 126 to assess how user 80N (or non-user participants) occupies and makes use of the space, such as a stage, classroom, conference room, office space, or area around a podium, in which he is speaking. For example, assessor 66 may determine from a visual or motion data feed that user 80N remains seated in a chair, while other discussion participants stand up and walk around a portion of the room. This results in a low space utilization value relative to the other participants in the room.

In some other embodiments, additionally or alternatively, assessor 66 can use hand pose and gesture recognition techniques 128 to identify a meaning, expression, or other significance of gestures or hand placement by user 80N (or non-user participants), such as exposing palms or keeping hands in pockets or behind one's back. For example, assessor 66 may determine from a visual or motion data feed that user 80N is gesturing with her palms facing outward and her hands low, conveying openness and approachability, and therefore receiving a high hand usage rating, with values indicating the outward facing palms and low hands.

Assessor 66 can use these same posture recognition techniques 122, facial recognition techniques 124, space recognition techniques 126, and hand pose and gesture recognition techniques 128 to analyze a reaction of a other participants in the discussion and/or audience members watching the discussion. For example, assessor 66 can determine that participants who are slouched in their seats are bored and are therefore not inclined to listen to any contribution of user 80N to the discussion. In another example, assessor 66 can determine that participants whose eyes are fixed on the speaking user 80N are engaged in what he is saying. In still another example, assessor 66 can determine that if the participants form a tight crowd around user 80N when she is speaking, then they are more interested in the content of what she is saying and/or manner in which she is saying it, than if the participants form a loose crowd dispersed throughout a room. In yet another example, assessor 66 can analyze actions and gestures (e.g., nodding, thumbs up) made by other participants/audience members to gauge a mood of those listening to user 80N (e.g., happy or unhappy). In some embodiments, assessor 66 can also determine demographics of the other participants/audience members, such as ages, genders, and likely cultural backgrounds, which can be used to determine if certain phrases or gestures of user 80N would be considered rude or inappropriate by that audience.

In one illustrative example, assessor 66 can determine based on slumped posture of other participants and an overall discussion dynamic of boredom, that a topic or group activity is not receiving the audience's attention and that there is a need to reacquire this attention. In response, system 60, as discussed further below, can identify a purposeful topic several board participants like or have in common and recommend that user 80N introduce the topic to drive up audience interest and active participation.

In another illustrative example, a group manager is requested to lead a group brainstorming session with a large group. However, the manager has difficulty keeping all his peers under control and on-topic. Assessor 66 can analyze the audience/participants and identify ideas or comments some of them have in common with others. Assessor 66 can then, based on the identified commonalities, provide the manager with instructions through IoT devices to divide participants into smaller groups.

In some embodiments, assessor 66 can use vocal recognition techniques to analyze an audio feed of captured data 70. These vocal recognition techniques can be used to identify paralanguage elements of the discussion, and to assign those elements values (e.g., ratings, such as on a 1-10 scale or percentage) indicative of a user's 80N skills at performing those elements and/or indicative of a particular behavior associated with those elements (e.g., a user who is mumbling may be assigned a particular code or value, whereas a user who has an uneven speaking cadence may be assigned a different code or value). Paralanguage elements of the discussion participation of user 80N can include, but are not limited to, voice quality (e.g., clear, mumbled), rate (e.g., fast, walking speed, slow), pitch (e.g., higher or lower than normal for user 80N), volume (e.g., sufficiently loud to be heard by all audience members/other participants, or not), mood (e.g., positive, angry, hopeful), rhythm (e.g., smooth, halting), intonation (e.g., inflections), stress (e.g., choice of words emphasized), and other elements of speaking style.

The vocal recognition techniques can also be used to parse the meaning (i.e., definition) of words spoken by user 80N or a transcript of these words. In some embodiments, assessor 66 can associate the parsed/transcribed words with a reaction of the other participants or audience to those words, and thereby determine content that is received favorably or unfavorably by the other participants or audience. Assessor 66 can assign values to parsed/transcribed words based on a reaction to the words by others or to a known connotation of the words, such as found in a dictionary or other reference resource. Assessor 66 can also assign ratings or other values for phrases spoken by user 80N. This may be accomplished by generating a conglomerate score for the phrase based on values of words therein contained, a reaction to the phrase, or a known connotation of the phrase, such as found in a dictionary or other reference resource. In some further embodiments, assessor 66 can weight particular words or phrases spoken by user 80N based on recognized non-verbal or paralanguage behavior accompanying a word or phrase. For example, a word or phrase that is accompanied by stressing the word or a sharp hand movement, or a dramatic pause after the word or phrase, can be assigned a more weighted value than a transitory word accompanied by none of these. Furthermore, in some embodiments, assessor 66 can monitor a flow of the discussion, charting topics discussed, participants who participated in each topic, etc. In the case that a discussion skews off course, assessor 66 can note the off-topic subject matter and alert system 60 to transmit instructions to steer the discussion back on course.

In some embodiments, assessor 66 can also analyze a data feed from a biologic sensor monitoring a physical condition of user 80N. For example, assessor 66 can determine that any of blood pressure, heart rate, and/or temperature of user 80N is above or below normal. Assessor 66 can compare such readings to known biological readings (such as data charts) to determine a physical condition of user 80N indicated by the reading. For example, an elevated pulse may be indicative of a nervous state, or a low blood pressure may be indicative of lightheadedness.

According to embodiments of the present invention, assessor 66 can generate discussion participation profiles 84A-N for each of users 80A-N. In some embodiments, this discussion participation profile 84N can include two components, a first portion containing verbal, non-verbal, and paralanguage elements (e.g., values indicative of group discussion participation) of the present group discussion participation of user 80N, and a second portion containing historic and learned data on user 80N. In the present discussion portion of profile 84N, assessor 66 can enter elements of the present discussion participation of user 80N as determined by assessor 66 from captured data 70, as described above. The present discussion portion of profile 84N is representative of the discussion participation of user 80N, and can contain, but is not limited to, an analysis of the verbal communication (i.e., a transcript of words spoken, values for their meaning or connotation), non-verbal communication (e.g., values describing user posture, mood, use of space, and gestures), and paralanguage communication (e.g., values describing voice quality, rate, pitch, volume, mood, rhythm, intonation, stress, and speaking style) of user 80N, as well as, for example, a reaction to user 80N by other participants or an audience. In some embodiments, the present discussion portion of profile 84N can also include other elements of the discussion participation of user 80N, such as a topic of speech (e.g., brainstorming ways to raise funds for the fight against pediatric diseases) or a goal of the discussion (e.g., generate a list of ways to raise funds for a charity). It should be noted that in some embodiments, profiles may be generated for non-user participants and added to discussion profile 82 in order to cover all elements of a discussion depicted in discussion profile 82.

The historic and learned data portion of discussion participation profile 84N can contain historic information on user 80N from past group discussions and other interactions. This can include analyses of verbal (i.e., a transcript of words spoken, values for their meaning or connotation), non-verbal (e.g., values describing user posture, mood, use of space, and gestures), and paralanguage (e.g., values describing voice quality, rate, pitch, volume, mood, rhythm, intonation, stress, and speaking style) communication of user 80N at previous discussions, as well as, for example, a reaction to user 80N by other participants or an audience. Discussion participation profile 84N can also include background information (e.g., age, gender, or other demographics) on user 80N, as well as characteristics, such as personality and level of speaking comfort. Discussion participation profile 84N can also include information on previous successful or unsuccessful real-time IoT feedback strategies, such as to which strategies or IoT devices user 80N is most/best responsive, areas of group discussion in which user 80N is attempting to improve (e.g., an area that user 80N has indicated he would like to focus), group discussion strengths or weaknesses of user 80N, etc.

In still some other embodiments, discussion participation profile 84N of user 80N can also contain background information (e.g., age, gender, or other demographics) on user 80N (e.g., inputted by user 80N or someone acting on behalf of user 80N) that may be used later to determine what discussion participation improvement strategies are most applicable to user 80N. For instance, a particular age or the presence of a health condition may be used to determine an amount of physical movement to recommend to user 80N. For example, if the hand of user 80N is broken, then she will not be instructed to perform hand movements.

In some embodiments, discussion participation profile 84N of user 80N can also include interests and/or areas of knowledge/expertise of user 80N. In some embodiments, these areas of interest/knowledge/expertise, etc., can be prepopulated by user 80N or another person acting on behalf of user 80N. In some other embodiments, system 60 can obtain interests/knowledge/expertise, etc., of user 80N from a social media profile of user 80N, a business profile of user 80N, or any other database. In still some other embodiments, system 60 can learn of user's 80N interests/knowledge/expertise, etc., from previous discussions, conversations, and/or interactions of user 80N with other people. In such an embodiment, assessor 66 can identify the subject area of content that user 80N contributed to previous discussions. Assessor 66 can determine that subject areas to which user 80N contributed more than a predetermined threshold, or with which user 80N contributed with more than a threshold level of enthusiasm, are likely areas of interest/knowledge/expertise, etc., of user 80N. System 60 can add these determined subject areas to the historic and learned data portion of discussion participation profile 84N of user 80N.

In an illustrative example, a team leader has gathered her team in a teleconference to brainstorm on ideas to improve team performance. The leader starts the session successfully but after a while she notices she is losing the team's attention. Based on tones, facial expressions, and comments identified by assessor 66, system 60, as discussed in more detail further below, can provide, through one or more IoT devices, the leader with ideas on topics to attract the attention of the team members, while relating to the session's goal. Because the team members are from different countries, system 60 recommends that the leader ask about the countries her team members are from, and, as several members of the team are design and structural engineers, how many internationally famous architects the different countries have and why the architects are well respected. This allows the leader to refocus her team's attention while steering the team towards a discussion about innovation, continuous improvement, and flexibility, which leads back on track towards their session's goal.

Assessor 66, as performed by computer system/server 12, can compare at least one of the participation profiles 84N in the discussion profile 82 to a reference participation profile 88A-C having a set of values that indicate an optimal verbal discussion, non-verbal discussion, and paralanguage discussion. System 60 can learn desirable and/or undesirable group discussion participation behaviors from past cohorts of users classified by group discussion participation behaviors stored in discussion participation and interaction databases 86 or any other reference database. These classified group discussion participation behaviors can include particular discussion participation difficulties or conditions, and their corresponding values, and ameliorative acts to cure such difficulties or conditions. Discussion participation and interaction databases 86 can also contain values for content such as best speaking/discussion practices, meanings of particular motions and actions, and even videos illustrating such motions and actions. Based on one or more reference profiles 88A-C, assessor 66 can create, or access preexisting, baseline optimal/ideal discussion participation actions with which to compare the present discussion participation of user 80N in his/her discussion participation profile 84N.

In some embodiments, assessor 66 and/or analyzer 64 can compare the overall flow or structure of a discussion to reference discussions. To accomplish this, assessor 66 and/or analyzer 64 can map a shape of the discussion (e.g., in a semantic web or similar data structure). For example, areas where participants go off topic may be indicated by portions in a data structure that branch off from a main topic. Discussions that remain on topic may maintain a relatively expected shape, as indicated by a reference shape, whereas conversations that wonder off-topic may be detected through their misshapen appearance. In some embodiments, assessor 66 and/or discussion analyzer 64 can use reference discussion profiles (e.g., based on practiced discussion methodologies) to predict a likely or optimal flow of conversation. Such optimal conversation information can be used as the basis for one or more IoT device-based discussion participation strategies (e.g., prompts to ask a specific type of question, to make a particular comment) formulated by improvement strategizer 68, discussed in more detail below.

Furthermore, in some embodiments, assessor 66 can use reference profiles 88A-C to determine appropriate or inappropriate behavior. For example, based on topic of conversation, type of discussion, roles of user 80N, etc., assessor 66 can select a template reference profile 88A-C representative of appropriate participation by user 80N in the discussion. Elements of participation that may be indicated in a reference profile include expected share of conversation, degree of interaction, and type of content offered to the discussion. System 60 can then offer recommendations to improve participation that does not conform to these expected behaviors.

When selecting profiles 88A-C to use as reference/baseline comparisons, assessor 66 can search for profiles that have similar or otherwise related topics of speech and/or discussion goals, to better compare the discussion participation of user 80N to a same type of discussion. For example, a discussion participation profile 84N for a casual social interaction between friends would be compared with profiles from other informal discussions, while a discussion participation profile 84N for a business meeting would be compared with profiles from other business and workplace interactions.

In some embodiments, assessor 66 can add new discussion participation profiles to discussion participation and interaction databases 86 as system 60 encounters new users and their participations in discussions. Assessor 66 can use machine learning techniques, as described above, to analyze and learn from these added discussion participation profiles to better tailor analyses and recommendations to subsequent discussion participation profiles.

Figure 4:
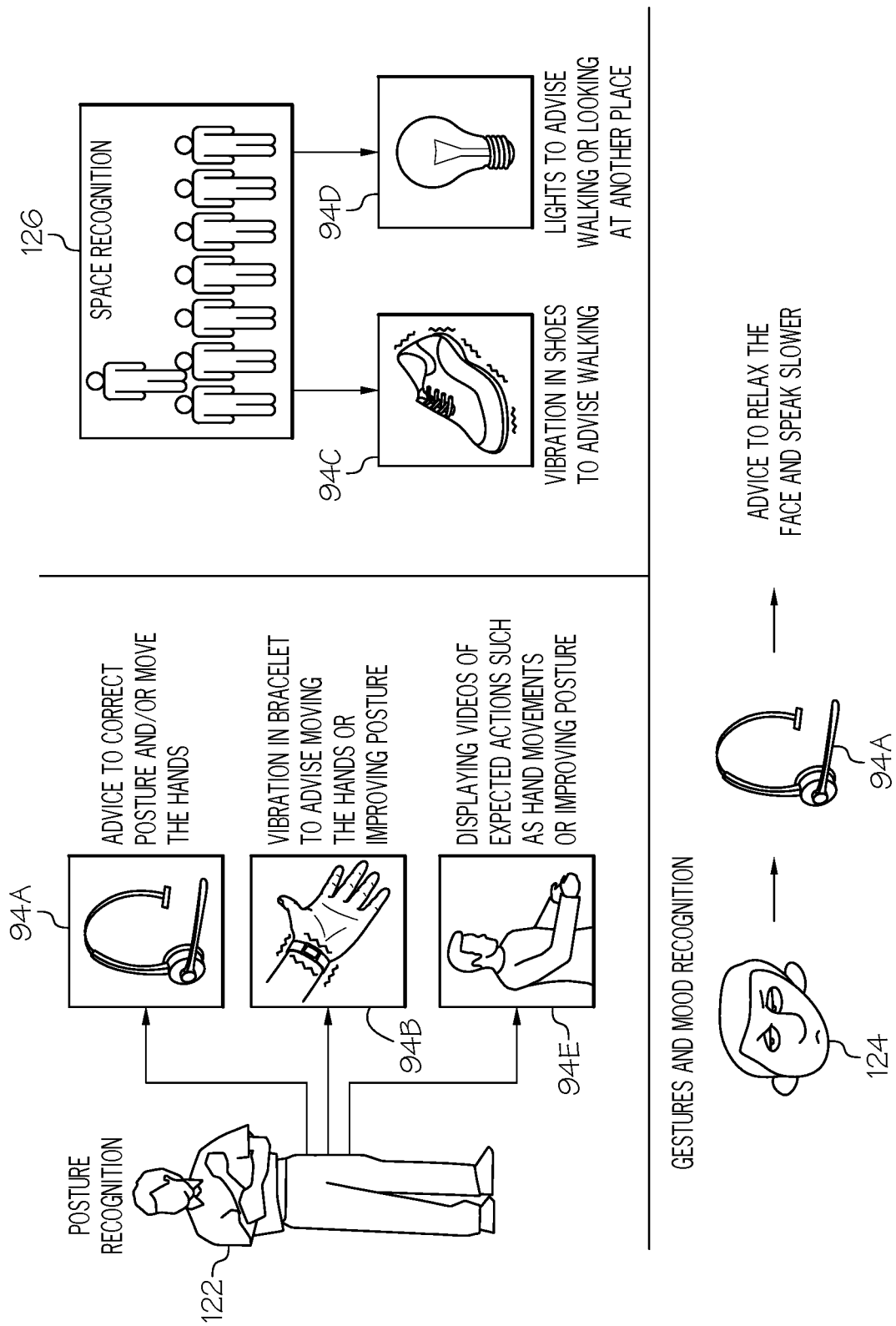
FIG. 4 shows a set of illustrative examples of real-time IoT improvement strategies according to illustrative embodiments.

Referring now to FIG. 4 in connection with FIG. 2 and FIG. 3, a set of illustrative examples of real-time IoT improvement strategies is shown. Discussion participation improvement strategizer 68 (hereinafter "strategizer 68"), as performed by computer system/server 12, can generate, based on the comparison of discussion participation profile 84N of user 80N to reference participation profiles 88A-C, a set of discussion participation improvement strategies 90 for at least one user 80N. To accomplish this, strategizer 68 can identify differences between the present discussion participation of user 80N described in discussion participation profile of user 84N and reference discussion participations 88A-C. Strategizer 68 can extrapolate from these differences one or more actions that user 80N should take to improve his or her discussion participation. From these identified actions, strategizer 68 can create one or more strategies for enhancing the discussion participation/interaction skills of user 80N by triggering actions on IoT devices 94A-E of IoT network 92, which can be associated with user 80N, such as movements, sounds, and visuals.

For example, in response to recognition of a poor posture with crossed arms of user 80N, strategizer 68 can develop an IoT-based strategy to cause user 80N to move his arms and stand straighter. This IoT-based strategy can include advising user 80N to correct his posture and move his hands through headphone IoT device 94A. Alternatively or additionally, this IoT-based strategy can include actuating a vibration in bracelet/watch IoT device 94B to cause user 80N to move his arms or a vibration in a microphone battery/power pack with IoT device features at the back of user 80N to remind him to stand up straight. Furthermore, alternatively or additionally, this IoT-based strategy can include displaying a video of expected actions, such as hand movements or better posture, on a video display device 94E, such as a teleprompter display device.

In another example, in response to a first user speaking more than 50% of the time and a second user speaking less than 2% of the time, strategizer 68 can develop a tandem IoT-based strategy for the first and second user. Strategizer 68 can instruct an IoT device (e.g., a color-changing bracelet) to alert the first user that she should wait five minutes before her next contribution or otherwise yield the floor to someone else, while also instructing another IoT device (e.g., a haptic bracelet) to alert the second user that now would be a good time to add a contribution to the discussion. In this manner, system 60 can encourage user participation while also providing a user with an actual opportunity to participate.

In yet another example, in response to recognition of poor space usage by user 80N as she speaks with a group, strategizer 68 can develop an IoT-based strategy to cause user 80N to move about the space available to her. This IoT-based strategy can include advising user 80N to walk by triggering a haptic actuator in a smart shoe 94C (an IoT wearable device) or by causing an array of lighted IoT devices 94D to signal a path user 80N should walk or a place user 80N should focus her eyes.

In still another example, in response to recognition of an anxious or nervous mood of user 80N, strategizer 68 can develop an IoT-based strategy to assist user 80N in feeling more calm. This IoT-based strategy can include advising user 80N to relax his face and speak more slowly through headphone IoT device 94A. Alternatively or additionally, this IoT-based strategy can include playing a slow pulse through headphone IoT device 94A or a haptic actuator of bracelet/watch IoT device 94B to assist in slowing speech and restoring a sense of calm.

Strategizer 68 can generate any number of participation improvement strategies 90 for one or more users 80A-N using any IoT device now known or later developed. Such discussion participation strategies 90 using IoT devices can include, but are not limited to, using actuators to perform motions, playing sounds, visuals, videos, music, voices, or other emissions of noise, projecting lights/patterns on a wall or other surface, emitting scents, causing vibrations, or other action that can be configured to support discussion participation by each of one or more users 80A-N.

Still referring to FIG. 2, FIG. 3, and FIG. 4, strategizer 68, as performed by computer system/server 12, can select a discussion participation improvement strategy 90 from the set of discussion participation improvement strategies 90 based on an identification of an availability of a set of IoT devices 94A-E for delivery of at least one of the set of discussion participation strategies 90. Strategizer 68 can send a communication to IoT network 92 or any IoT devices 94A-E in IoT network 92, requesting the return of an inventory or other device identifying information to determine what IoT devices 94A-E are presently available for use by strategizer 68 to communicate IoT discussion participation strategy 90 to each user 80N. In some embodiments, each user 80N can have an IoT network 92 associated with that user. In still other embodiments, IoT network 92 can be a generic network, including devices each belonging to different users. Strategizer 68 can obtain this identifying information from a return communication from IoT network 92, or by any other means now known or presently developed. Based on which IoT devices 94A-E are available, strategizer 68 can identify which of generated IoT discussion participation strategies 90 are capable of implementation and which are not. From the IoT discussion participation strategies 90 capable of implementation, strategizer 68 can select one or more strategies to present to user 80N.

This selection can be based on a number of factors, such as, but not limited to, a historic preference of user 80N for IoT strategies that use a particular IoT device or an aggregate user preference of many users for IoT strategies that use a particular IoT device. This preference can be expressed as a ranking of IoT devices for training particular discussion participation skills. For example, if a user has responded promptly to a vibration in bracelet/watch IoT device 94B with an uncrossing of her arms, then that signal may be desirable to use again in the case that the user is crossing her arms. Another factor that the selection can be based on is severity of a discussion participation problem or an area that has been identified as needing improvement. For example, if user 80N appears very nervous and is making limited use of his space, strategizer 68 can select an IoT strategy that focuses on helping user 80N to feel less nervous, as opposed to a strategy that advises user 80N to move about more. It should be understood, however, that in some embodiments, strategizer 68 can select two or more IoT discussion participation strategies 90 to implement essentially simultaneously for the same user, such as in the example above in which tandem IoT-based instructions were issued to a first user to yield the floor and to a second user to speak up and add a discussion contribution.

Strategizer 68, as performed by computer system/server 12, can communicate, responsive to the captured discussion between the plurality of users 80A-N, instructions to deliver the selected discussion participation improvement strategy 90 to at least one of the plurality of users 80A-N through an output user interface of available IoT device 94A-E during the discussion at strategy implementation step 130. This allows IoT discussion participation strategy 90 to be implemented in real time, as user 80N is speaking or listening to another participant speak. Therefore, as deficiencies are recognized in the discussion participation of one or more users 80A-N, strategizer 68 can provide user 80N with an ameliorative or otherwise enhancing action to correct the deficiency moving forward in the discussion.

For example, system 60 can determine that an attendee at a brainstorming session, while she is very interested in the topic of achieving the goals set at the beginning of the session, has not been able to find a way to start talking, provide ideas, and be an active participant. Analyzer 64 can map a flow of the brainstorming discussion and determine that the discussion is using a design thinking methodology to identify potential solutions to a problem. Based on historic discussion mappings and the identified methodology, analyzer 64 can predict a direction in which the conversation is heading. Based on the predicted conversation and the attendee's own historic and present participation profile, assessor 66 can determine that the attendee would benefit from having guidance on questions and comments to facilitate her participation in the discussion. Though an IoT device, such as a display screen, strategizer 68 can then guide the attendee on comments or questions she can make to offer solutions or further explore the problem in order to be part of the discussion. These prompts allow the attendee to feel more comfortable and confident while participating in the discussion. In another strategy, particularly if the first strategy fails, strategizer 68 can provide the attendee with the opportunity to type her ideas or comments into an IoT device and share them in real time, without placing the attendee in the spotlight, which the attendee's profile indicates makes her uncomfortable.

In another example, a person has been instructed to host several brainstorming sessions throughout the year. Prior to these sessions, system 60 has been used by several intended attendees at other brainstorming sessions. Assessor 66 has added these attendees' sentiments from the earlier other sessions, including activities, comments, tones, and different expressions, to participation profiles of the attendees. During the host's sessions, system 60 can provide the host and other users through a network of IoT devices with ideas and real-time guidance (while also analyzing the current audience/participants) based on the historic data recorded in the profiles.

In some embodiments of the present invention, obtainer 62, as performed by computer system/server 12, can detect a response of user 80N to the delivery of selected discussion participation strategy 90 through the output user interface of the available IoT device 94A-E during the discussion, and assessor 66, as performed by computer system/server 12, can add the detected user response to selected discussion participation improvement strategy 90 to participation profile 84N of user 80N. In this manner, system 60 can learn from user 80N which discussion participation strategies and IoT devices user 80N reacts best or worse to and, therefore, which discussion participation improvement strategies are optimal to present to user 80N. These detected user responses can be added to discussion participation profile 84N as historical data on user 80N. In some embodiments, system 60 can also save the detected user response to selected discussion participation improvement strategy 90 to discussion participation and interaction databases 86, to use as a reference against other users. In some embodiments, a recording of the discussion participation of user 80N can be saved to discussion participation and interaction databases 86 for further analysis.

In addition to learning which strategies work best for user 80N, system 60 can also learn when best to present a discussion participation improvement strategy 90 to user 80N (e.g., when user 80N is taking a sip of water, listening to another participant, etc.) to prevent interrupting the flow of the discussion. For example, if presenting a discussion participation improvement strategy 90 appears to have caused user 80N to lose his train of thought, system 60 can search for a natural pause during which to present subsequent discussion participation improvement strategies 90. Furthermore, in the case that presenting discussion participation improvement strategy 90 causes user 80N to lose her train of thought, strategizer 68 can instruct an IoT device 94A-E to implement a strategy to return user 80N to her last remarks, such as displaying a transcript on video display device 94E of the last words spoken by user 80N, or playing the words back over headphone IoT device 94A.

In some embodiments, in cases where assessor 66 determines that user 80N is unresponsive to or did not respond as intended to selected discussion participation improvement strategy 90, strategizer 68 can rank available discussion participation improvement strategies 90 for user 80N according to a historic effectiveness of each of strategies 90. Strategizer 68 can then communicate, responsive to the detected response of user 80N to the delivery of the selected discussion participation improvement strategy 90 being a negative response, instructions to deliver a next best discussion participation improvement strategy 90 (according to the ranking) to one of the available IoT devices 94A-E during the discussion. This permits system 60 to implement fallback discussion participation improvement strategies in the case that user 80N fails to understand the discussion participation improvement strategy communicated through an IoT device 94A-E or the action of IoT device 94A-E fails to elicit the desired response.

In an illustrative example, a spokesman is giving a press conference when a reporter asks a question the spokesman did not expect. Assessor 66 determines from the spokesman's gestures and facial expression (recorded by visual sensor 74B), tone (analyzed by a tone analyzer), and heightened pulse rate (recorded by a biometric sensor), that the spokesman is surprised by the topic. Assessor 66 can further determine, from expressions on the faces of the audience, that this surprise is being transmitted to the audience through the tone and gestures. Strategizer 68 can devise a set of strategies to guide the spokesman to improve his discussion with the reporter. Strategizer 68 can, for example, identify strategies such as: triggering an alert that the spokesman is projecting anxious signals (e.g., through a haptic vibration in bracelet/watch IoT device 94B), instructing the spokesman to look at friendly faces in the audience to help feel comfortable again (e.g., through headphone IoT device 94A), prompting the spokesman to breathe deeply (e.g., through showing a person taking a deep breath on video display device 94E), etc. Strategizer 68 may trigger the warning first, and if this fails to cause the spokesman to calm himself, strategizer 68 may then move on to providing the spokesman with the instructions to look at friendly faces or to breathe.

In some embodiments of the present invention, system 60 can be used as a discussion participation training tool with which a user can practice discussion participation/interaction skills without an audience. System 60, as performed by computer system/server 12, can generate a group discussion scenario having a set of parameter constraints and communicate this group discussion scenario to user 80N. System 60 can then monitor the participation in the simulated group discussion by user 80N under the set of parameter constraints. For example, system 60 may initiate a topic and have a set of AI systems "discuss" the topic in a simulated conversation, delivered to user 80N in real time, with simulated human voices. System 60 can instruct user 80N to contribute to the conversation, and relay the contributions of user 80N to the AI systems, so that user 80N participates in the simulated conversation. Based on the scenario and participation by user 80N, strategizer 68 can then guide user 80N through discussion improvement strategies 90 to address the scenario and ongoing conversation.

In another example, system 60 may prompt user 80N to pause his discussion participation and practice a particular skill, such as hand movements. In still other examples, system 60 may present user 80N with an emergency drill scenario, in which something has gone wrong or is less than ideal in the group discussion, such as a time limit on the discussion; the presence of a hostile, interruptive, over-talkative, or otherwise damaging participant in the discussion; a conversation that is off topic; distracted participants/audience; the presence of different types of discussion participants, such as business people and later athletic team members; etc. In each of these "drill" scenarios, system 60 can challenge user 80N to attempt to continue the discussion under the "emergency" scenario, while monitoring the participation of user 80N. In some embodiments, strategizer 68 can be configured to provide user 80N with any needed guidance to navigate through the emergency drill scenario.

In some embodiments of the present invention, system 60 can be used to perform an analysis of a group discussion after the fact, as a tool to assist a user in identifying group discussion skills in need of improvement and then providing coaching, as described above, in developing them. For instance, in an illustrative example, a new manager wants to give the best first impression to his team during his first meeting. The new manager decides to use system 60 during the meeting to improve any deficiencies in his meeting participation in real time. However, on the day of the meeting, his office has guests from another country who speak a language different than the manager's primary language. The new manager is told by his supervisor to conduct the meeting in the second language, of which the new manager has only a limited knowledge, for the benefit of the guests. During the meeting, system 60 detects that the new manager made several grammatical mistakes, his face was transmitting fear, and he was apologizing for those mistakes when he noticed them. In response to these detections, system 60, through a network of IoT devices associated with the new manager, encouraged the new manager to be confident. System 60 also reminded the new manager, through a haptic feedback device, to stop apologizing each time he begins to do so and to not draw attention to errors he makes. After the meeting, system 60 can provide the new manager with an analysis of his performance at the meeting. This analysis can include showing the manager his discussion participation profile 84N. From the profile, he can see that he often apologizes when speaking in a second language, and that such diverts audience focus away from his actual message. In order to address this weak skill area, the manager can have system 60 run several scenarios for him in which he discusses with AIs in the second language, allowing him to practice confident speaking skills in the language for future real group discussions.

In some embodiments, system 60 can be configured to interact with other IoT devices and/or systems through IoT network 92 to facilitate elements of the discussion. For example, in a negotiation, arbitration, or other agreement writing discussion, system 60 can instruct other IoT devices, such as a printer or device running smart contract software, to execute actions based on the discussed agreements. For instance, in a discussion in which participants must agree to multiple terms, system 60 can instruct an IoT device to update legal or system documents to reflect the agreed upon terms of the discussion.

Figure 5:
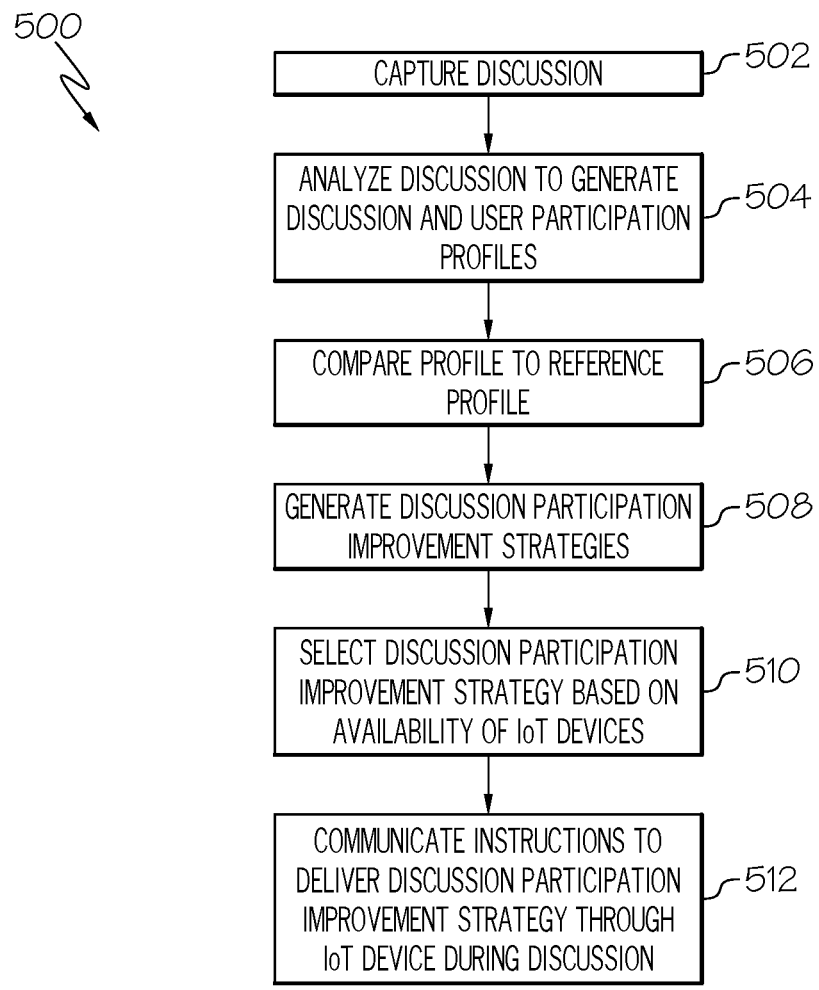
FIG. 5 shows a process flowchart for improving a group discussion among a plurality of users in real time using IoT feedback according to illustrative embodiments.

As depicted in FIG. 5, in one embodiment, a system (e.g., computer system/server 12) carries out the methodologies disclosed herein. Shown is a process flowchart 500 for improving a group discussion among a plurality of users in real time using IoT feedback. At 502, discussion participation data obtainer 62 captures a set of data 70 representative of a discussion among a plurality of users 80A-N. At 504, discussion participation assessor 66 analyzes captured data 70 for a discussion dynamic between at least two users of the plurality of users 80A-N, the analyzing comprising assigning a set of values to a verbal element of the discussion, a non-verbal element of the discussion, and a paralanguage element of the discussion, to generate a profile of the discussion 82, the discussion profile 82 comprising a participation profile 84N for each of the at least two users 80A-N. At 506, discussion participation assessor 66 compares at least one of the participation profiles 84N in the discussion profile 82 to a reference participation profile 88A-C having a set of values that indicate an optimal verbal discussion, non-verbal discussion, and paralanguage discussion. At 508, discussion participation improvement strategizer 68 generates, based on the comparison, a set of discussion participation improvement strategies 90 for at least one of the plurality of users 80A-N. At 510, discussion participation improvement strategizer 68 selects a discussion participation improvement strategy 90 from the set of discussion participation improvement strategies 90 based on an identification of an availability of a set of IoT devices 94A-E for delivery of at least one of the set of discussion participation strategies 90. At 512, discussion participation improvement strategizer 68 communicates, responsive to the captured discussion between the plurality of users 80A-N, instructions to deliver the selected discussion participation improvement strategy 90 to at least one of the plurality of users 80A-N through an output user interface of the available IoT device 94A-E during the discussion.

Process flowchart 500 of FIG. 5 illustrates the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices, or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, program/utility 40 may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Any of the components provided herein can be deployed, managed, serviced, etc., by a service provider that offers to deploy or integrate computing infrastructure with respect to a process for improving a group discussion among a plurality of users in real time using IoT feedback. Thus, embodiments herein disclose a process for supporting computer infrastructure, comprising integrating, hosting, maintaining, and deploying computer-readable code into a computing system (e.g., computer system/server 12), wherein the code in combination with the computing system is capable of performing the functions described herein.

In another embodiment, the invention provides a method that performs the process steps of the invention on a subscription, advertising, and/or fee basis. That is, a service provider, such as a Solution Integrator, can offer to create, maintain, support, etc., a process for improving a group discussion among a plurality of users in real time using IoT feedback. In this case, the service provider can create, maintain, support, etc., a computer infrastructure that performs the process steps of the invention for one or more customers. In return, the service provider can receive payment from the customer(s) under a subscription and/or fee agreement, and/or the service provider can receive payment from the sale of advertising content to one or more third parties.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is apparent that there has been provided herein approaches to improve a group discussion among a plurality of users in real time using IoT feedback. While the invention has been particularly shown and described in conjunction with exemplary embodiments, it will be appreciated that variations and modifications will occur to those skilled in the art. Therefore, it is to be understood that the appended claims are intended to cover all such modifications and changes that fall within the true spirit of the invention.

What is claimed is:

1. A method for improving a group discussion among a plurality of users in real time using internet of things (IoT) feedback, the method comprising:
    capturing a set of data representative of the discussion between the plurality of users;
    analyzing the captured data for a discussion dynamic between at least two users of the plurality of users, the analyzing comprising assigning a set of values to a verbal element of the discussion, a non-verbal element of the discussion, and a paralanguage element of the discussion, to generate a profile of the discussion, the discussion profile comprising a participation profile for each of the at least two users;
    comparing at least one of the participation profiles in the discussion profile to a reference participation profile having a set of values that indicate an optimal verbal discussion, non-verbal discussion, and paralanguage discussion;
    generating, based on the comparison, a set of discussion participation improvement strategies for at least one of the plurality of users;
    selecting a discussion participation improvement strategy from the set of discussion participation improvement strategies based on an identification of an availability of a set of IoT devices for delivery of at least one of the set of discussion participation improvement strategies; and
    communicating, responsive to the captured discussion between the plurality of users, instructions to deliver the selected discussion participation improvement strategy to the at least one of the plurality of users through an output user interface of the available IoT device during the discussion.

2. The method of claim 1, the method further comprising:
    detecting a response of the at least one of the plurality of users to the delivery of the selected discussion participation improvement strategy through the output user interface of the available IoT device during the discussion; and
    adding the detected user response to the selected discussion participation improvement strategy to the participation profile of the at least one of the plurality of users.

3. The method of claim 2, the method further comprising:
    ranking the available set of discussion participation improvement strategies for the at least one of the plurality of users according to a historic effectiveness of each of the set of discussion participation improvement strategies; and
    communicating, responsive to the detected response of the at least one of the plurality of users to the delivery of the selected discussion participation improvement strategy being a negative response, instructions to deliver a next best discussion participation improvement strategy according to the ranking to one of the available IoT devices during the discussion.

4. The method of claim 1, the method further comprising:
    detecting a reaction by another user of the plurality of users to the discussion between the plurality of users;
    generating the profile of the discussion based on the detected reaction; and
    providing a discussion participation improvement strategy to the other user based on the detected reaction.

5. The method of claim 1, wherein the set of data comprises video, audio, or sensor data,
    wherein the verbal element of the discussion comprises a verbal element selected from the group consisting of: a spoken word, and a spoken word meaning;
    wherein the non-verbal element of the discussion comprises a non-verbal element selected from the group consisting of: posture, mood, use of space, and gestures, and
    wherein the paralanguage element of the discussion comprises a paralanguage element selected from the group consisting of: voice quality, voice rate, voice pitch, voice volume, mood, voice rhythm, voice intonation, stress, and speaking style.

6. The method of claim 1, wherein at least one of the set of discussion participation improvement strategies comprises a prompt, performable by an IoT device, for the at least one of the plurality of users to perform a designated action, and wherein at least one of the set of IoT devices is a device selected from the group consisting of: an audio-playing IoT device, a light display IoT device, a haptic IoT device, and a display screen IoT device.

7. The method of claim 1, the method further comprising:
    analyzing a content of the discussion from the captured set of data;
    adding the analysis of the content of the discussion to the discussion profile;
    generating, based on the analysis of the content of the discussion, a discussion participation improvement strategy for the at least one of the plurality of users that includes recommended discussion content; and
    communicating instructions to communicate the recommended discussion content to the at least one of the plurality of users through an output user interface of the available IoT device during the discussion.

8. The method of claim 1, the method further comprising using a machine learning algorithm to generate the discussion profile based on previous discussion participations of at least some users of the plurality of users with IoT devices.

9. A computer system for improving a group discussion among a plurality of users in real time using internet of things (IoT) feedback, the computer system comprising:
    a non-transitory memory medium comprising program instructions;
    a bus coupled to the non-transitory memory medium; and
    a processor, for executing the program instructions, coupled to an IoT group discussion coach engine via the bus that when executing the program instructions causes the system to:
    capture a set of data representative of the discussion between the plurality of users;
    analyze the captured data for a discussion dynamic between at least two users of the plurality of users, the analyzing comprising assigning a set of values to a verbal element of the discussion, a non-verbal element of the discussion, and a paralanguage element of the discussion, to generate a profile of the discussion, the discussion profile comprising a participation profile for each of the at least two users;

compare at least one of the participation profiles in the discussion profile to a reference participation profile having a set of values that indicate an optimal verbal discussion, non-verbal discussion, and paralanguage discussion;

generate, based on the comparison, a set of discussion participation improvement strategies for at least one of the plurality of users;

select a discussion participation improvement strategy from the set of discussion participation improvement strategies based on an identification of an availability of a set of IoT devices for delivery of at least one of the set of discussion participation improvement strategies; and communicate, responsive to the captured discussion between the plurality of users, instructions to deliver the selected discussion participation improvement strategy to the at least one of the plurality of users through an output user interface of the available IoT device during the discussion.

10. The computer system of claim 9, the instructions further causing the system to:

detect a response of the at least one of the plurality of users to the delivery of the selected discussion participation improvement strategy through the output user interface of the available IoT device during the discussion; and add the detected user response to the selected discussion participation improvement strategy to the participation profile of the at least one of the plurality of users.

11. The computer system of claim 10, the instructions further causing the system to:

rank the available set of discussion participation improvement strategies for the at least one of the plurality of users according to a historic effectiveness of each of the set of discussion participation improvement strategies; and communicate, responsive to the detected response of the at least one of the plurality of users to the delivery of the selected discussion participation improvement strategy being a negative response, instructions to deliver a next best discussion participation improvement strategy according to the ranking to one of the available IoT devices during the discussion.

12. The computer system of claim 9, the instructions further causing the system to:

detect a reaction by another user of the plurality of users to the discussion between the plurality of users;

generate the profile of the discussion based on the detected reaction; and provide a discussion participation improvement strategy to the other user based on the detected reaction.

13. The computer system of claim 9, wherein the set of data comprises video, audio, or sensor data, wherein the verbal element of the discussion comprises a verbal element selected from the group consisting of: a spoken word, and a spoken word meaning;

wherein the non-verbal element of the discussion comprises a non-verbal element selected from the group consisting of: posture, mood, use of space, and gestures, and wherein the paralanguage element of the discussion comprises a paralanguage element selected from the group consisting of: voice quality, voice rate, voice pitch, voice volume, mood, voice rhythm, voice intonation, stress, and speaking style.

14. The computer system of claim 9, wherein at least one of the set of discussion participation improvement strategies comprises a prompt, performable by an IoT device, for the at least one of the plurality of users to perform a designated action, and wherein at least one of the set of IoT devices is a device selected from the group consisting of: an audio-playing IoT device, a light display IoT device, a haptic IoT device, and a display screen IoT device.

15. The computer system of claim 9, the instructions further causing the system to:

analyze a content of the discussion from the captured set of data;

add the analysis of the content of the discussion to the discussion profile;

generate, based on the analysis of the content of the discussion, a discussion participation improvement strategy for the at least one of the plurality of users that includes recommended discussion content; and communicate instructions to communicate the recommended discussion content to the at least one of the plurality of users through an output user interface of the available IoT device during the discussion.

16. The computer system of claim 9, the instructions further causing the system to use a machine learning algorithm to generate the discussion profile based on previous discussion participations of at least some users of the plurality of users with IoT devices.

17. A computer program product for improving a group discussion among a plurality of users in real time using internet of things (IoT) feedback, the computer program product comprising a computer readable hardware storage device, and program instructions stored on the computer readable hardware storage device, to:

capture a set of data representative of the discussion between the plurality of users;

analyze the captured data for a discussion dynamic between at least two users of the plurality of users, the analyzing comprising assigning a set of values to a verbal element of the discussion, a non-verbal element of the discussion, and a paralanguage element of the discussion, to generate a profile of the discussion, the discussion profile comprising a participation profile for each of the at least two users;

compare at least one of the participation profiles in the discussion profile to a reference participation profile having a set of values that indicate an optimal verbal discussion, non-verbal discussion, and paralanguage discussion;

generate, based on the comparison, a set of discussion participation improvement strategies for at least one of the plurality of users;

select a discussion participation improvement strategy from the set of discussion participation improvement strategies based on an identification of an availability of a set of IoT devices for delivery of at least one of the set of discussion participation improvement strategies; and communicate, responsive to the captured discussion between the plurality of users, instructions to deliver the selected discussion participation improvement strategy to the at least one of the plurality of users through an output user interface of the available IoT device during the discussion.

18. The computer program product of claim 17, the computer readable storage device further comprising instructions to:
rank the available set of discussion participation improvement strategies for the at least one of the plurality of users according to a historic effectiveness of each of the set of discussion participation improvement strategies; and
detect a response of the at least one of the plurality of users to the delivery of the selected discussion participation improvement strategy through the output user interface of the available IoT device during the discussion;
add the detected user response to the selected discussion participation improvement strategy to the participation profile of the at least one of the plurality of users; and
communicate, responsive to the detected response of the at least one of the plurality of users to the delivery of the selected discussion participation improvement strategy being a negative response, instructions to deliver a next best discussion participation improvement strategy according to the ranking to one of the available IoT devices during the discussion.

19. The computer program product of claim 17, the computer readable storage device further comprising instructions to:
detect a reaction by another user of the plurality of users to the discussion between the plurality of users;
generate the profile of the discussion based on the detected reaction; and
provide a discussion participation improvement strategy to the other user based on the detected reaction.

20. The computer program product of claim 17, the computer readable storage device further comprising instructions to:
analyze a content of the discussion from the captured set of data;
add the analysis of the content of the discussion to the discussion profile;
generate, based on the analysis of the content of the discussion, a discussion participation improvement strategy for the at least one of the plurality of users that includes recommended discussion content; and
communicate instructions to communicate the recommended discussion content to the at least one of the plurality of users through an output user interface of the available IoT device during the discussion.

* * * * *